United States Patent
Mason

(10) Patent No.: US 10,059,379 B2
(45) Date of Patent: Aug. 28, 2018

(54) WHEEL WELL FENDER EDGE GUARD

(71) Applicant: Michael P. Mason, Gaylord, MI (US)

(72) Inventor: Michael P. Mason, Gaylord, MI (US)

(*) Notice: Subject to any disclaimer, the term of this patent is extended or adjusted under 35 U.S.C. 154(b) by 0 days.

(21) Appl. No.: 15/495,021

(22) Filed: Apr. 24, 2017

(65) Prior Publication Data
US 2017/0313364 A1 Nov. 2, 2017

Related U.S. Application Data

(60) Provisional application No. 62/328,149, filed on Apr. 27, 2016.

(51) Int. Cl.
B62D 25/00 (2006.01)
B62D 25/18 (2006.01)

(52) U.S. Cl.
CPC ................ B62D 25/182 (2013.01)

(58) Field of Classification Search
None
See application file for complete search history.

(56) References Cited

U.S. PATENT DOCUMENTS

| 4,205,861 | A |   | 6/1980  | Roberts et al. |            |
|-----------|---|---|---------|----------------|------------|
| 4,629,204 | A | * | 12/1986 | Arenhold       | B62D 25/18 |
|           |   |   |         |                | 280/851    |
| 5,299,832 | A | * | 4/1994  | Price, Sr.     | B62J 15/02 |
|           |   |   |         |                | 280/152.1  |
| 5,326,135 | A | * | 7/1994  | Nakayama       | B62D 25/16 |
|           |   |   |         |                | 280/850    |
| 5,582,430 | A |   | 12/1996 | Bauer et al.   |            |
| 6,648,373 | B2| * | 11/2003 | Hawes          | B62D 25/168|
|           |   |   |         |                | 280/154    |
| 6,802,517 | B1| * | 10/2004 | Wuthrich       | B62D 25/18 |
|           |   |   |         |                | 280/157    |
| 2004/0140664 | A1 | * | 7/2004 | Ward        | B62D 25/18 |
|           |   |   |         |                | 280/848    |
| 2007/0182151 | A1 | * | 8/2007 | Aulabaugh   | B62D 25/161|
|           |   |   |         |                | 280/849    |

* cited by examiner

Primary Examiner — John Daniel Walters
Assistant Examiner — Hilary Lynn Johns
(74) Attorney, Agent, or Firm — Northern Michigan Patent Law, PLC

(57) ABSTRACT

A wheel well/fender guard comprising a flat, curved, narrow rectangular panel secured in parallel spaced relationship to the outer edge of a vehicle wheel well, to protect the outer edge. The guard has flat upper and lower surfaces that are generally perpendicular to the plane of the vehicle body panel around the wheel well, and is spaced from the wheel well outer edge by a plurality of spacers secured at intervals along the upper surface of the guard. The spacers are substantially narrower than the guard, which is itself substantially narrower than the width of the wheel well as a whole.

5 Claims, 4 Drawing Sheets

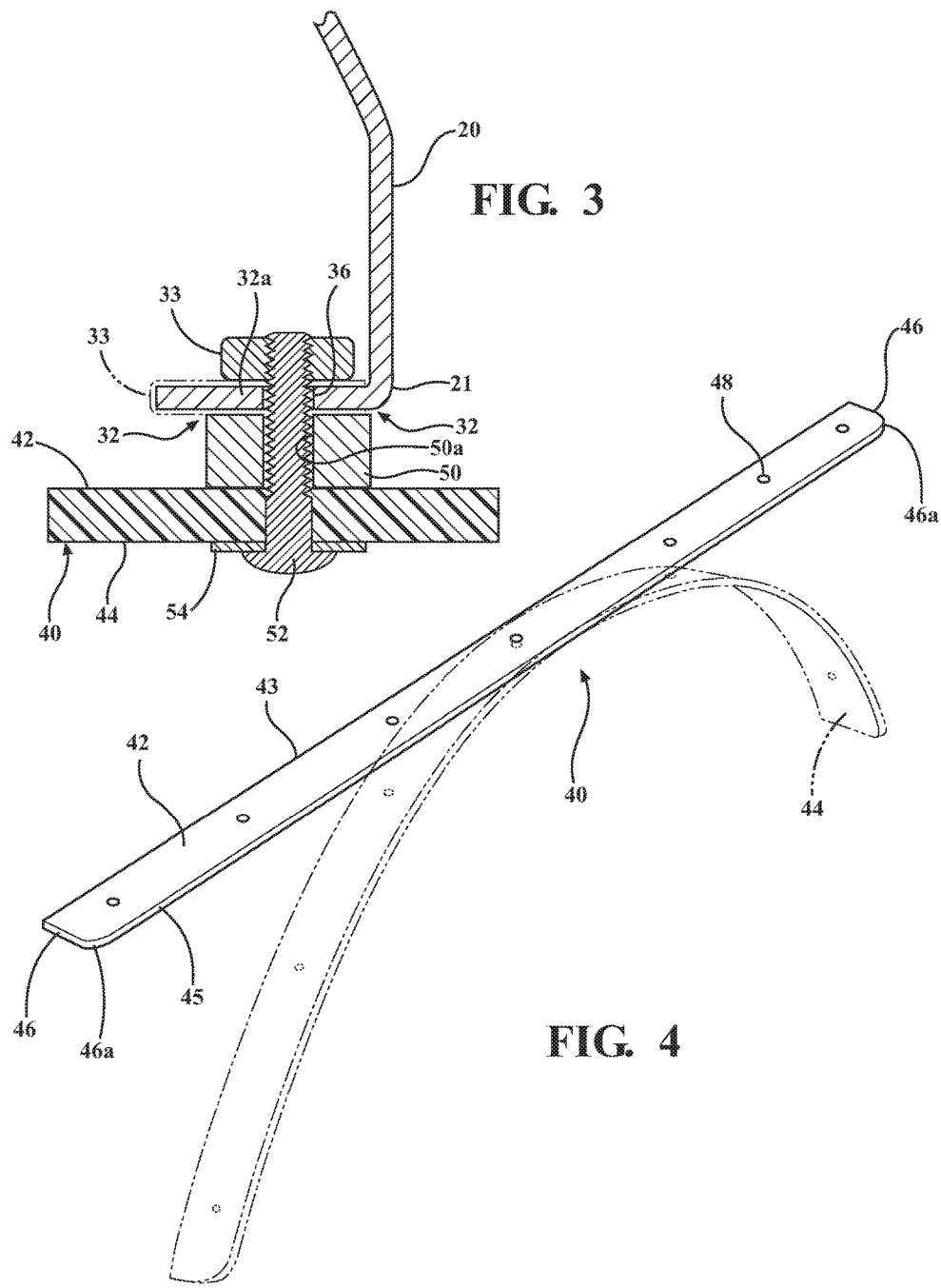

WHEEL WELL FENDER EDGE GUARD

RELATED APPLICATIONS/PRIORITY BENEFIT CLAIM

This application claims the benefit of U.S. Provisional Application No. 62/328,149, filed Apr. 27, 2016 by the same inventor (Mason), the entirety of which provisional application is hereby incorporated by reference.

FIELD

The subject matter of the present application is in the field of fender and wheel well guards.

BACKGROUND

Guards for protecting the finish of vehicles around their fenders and wheel wells are known. Examples include those shown in U.S. Pat. Nos. 4,629,204; 5,582,430; and U.S. Published Application No. 2007/0182151.

Prior wheel well or fender guards tend to have complex shapes and attachment structures that would make them relatively expensive and complicated to install as aftermarket accessories. More importantly, they tend to trap water, salt, and dirt against or near the car body, and/or interfere with the ability to wash these corrosion-causing materials out of the wheel well.

BRIEF SUMMARY

The present invention is a wheel well or fender guard comprising a narrow, flat, rectangular panel, curved in a semi-circle and corresponding to the width and curvature of a wheel well's outer edge or perimeter defined by a vehicle body panel. The guard is mounted in the wheel well with a substantially continuous gap between the upper face of the guard and the wheel well outer edge. The guard is a flat-sectioned curved plane, with a substantially flat contour across the upper and lower faces (flat in cross-section, i.e. when viewed across the width of the guard), and is mounted around the wheel well outer edge with the upper and lower faces maintained in an essentially perpendicular orientation to the vertical plane of the wheel well perimeter as approximately defined by the vehicle body panel, and essentially parallel to the face of the tire. The guard has a width corresponding to the width of the wheel well outer perimeter or "fender" portion, but substantially less than the width of the wheel well as a whole, so that the guard protects primarily the perimeter of the wheel well corresponding to the edge of the vehicle body panel defining the well.

The guard is mounted at the wheel well perimeter via intermittent spacers extending between the upper face of the guard and the wheel well. The spacers may be fastened to the guard and to the wheel well with screws or similar fasteners. The spacers are the only break in the otherwise continuous gap between the upper face of the guard and the wheel well.

The flat-sectioned surfaces and narrow width of the guard; the spaced, curved-parallel mounting of the guard to the wheel well with a substantially constant gap around the wheel well perimeter; and the guard's substantially perpendicular relationship to the vertical plane of the wheel well facilitate the release of mud, salt, ice, snow, dirt and other debris. If mud, salt, snow, etc. manage to accumulate between the guard and the wheel well under extreme conditions, the flat upper face of the guard is easily washed off with a hose or a car wash spray without leaving water and debris trapped between the guard and the wheel well.

It will be understood that "wheel well" perimeter or outer edge as used herein includes vehicle panels with integral flared portions or fenders.

These and other features and advantages of the invention will become apparent from the detailed description below, in light of the accompanying drawings.

BRIEF DESCRIPTION OF THE DRAWINGS

FIG. 3 is a detail section view of the guard of FIG. 1 through one of the spacers as installed in a wheel well.

FIG. 4 is a perspective view of the guard of FIG. 1, shown in a flat configuration prior to installation, in solid lines; and in a curved configuration corresponding to the shape when installed in a wheel well, in phantom lines.

DETAILED DESCRIPTION

Figure 1:
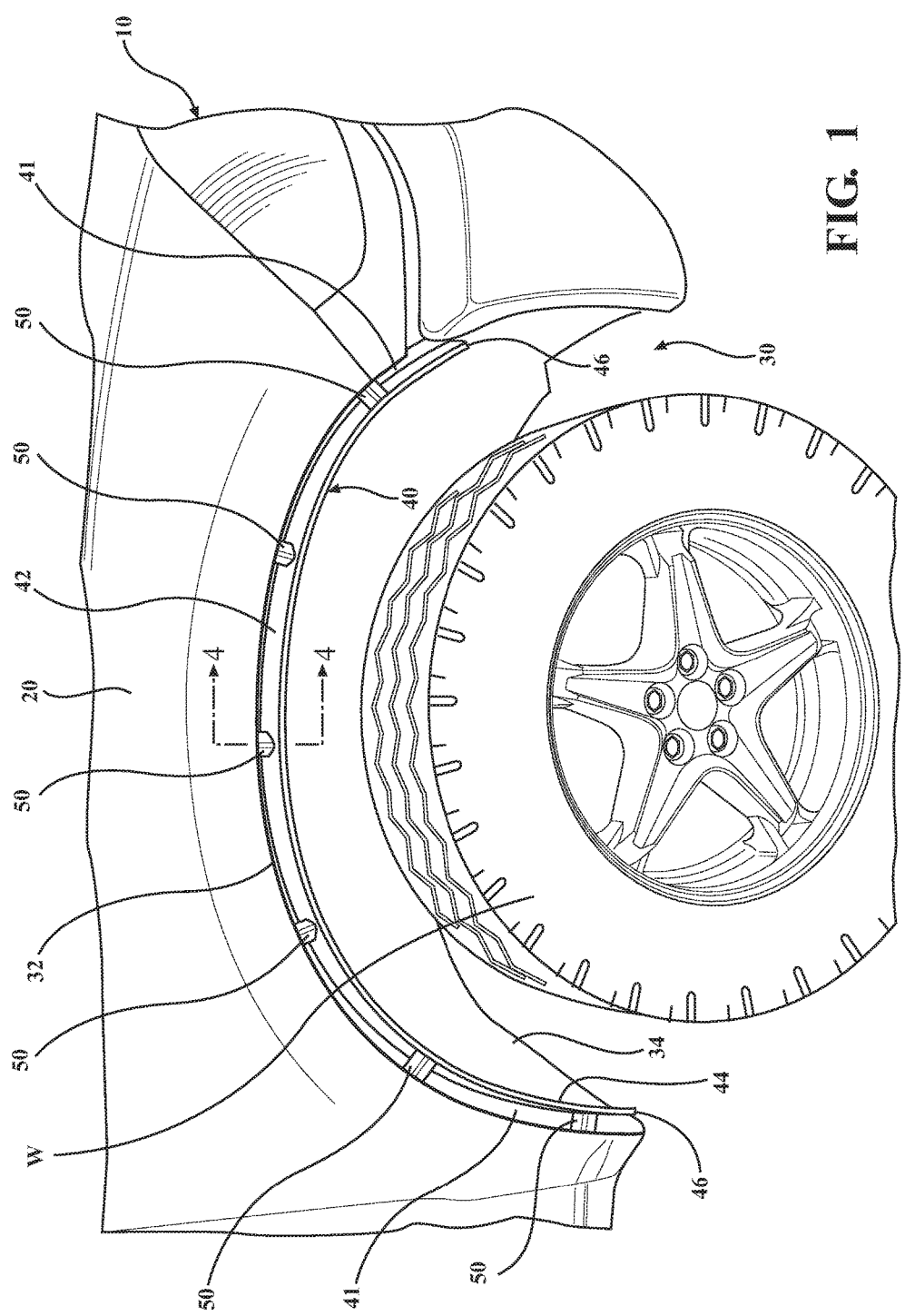
FIG. 1 is a side view of an example wheel well guard according to the invention, installed on a vehicle.

Referring first to FIG. 1, a vehicle 10 is shown with a substantially vertical side panel 20 defining the opening of a wheel well 30 of common form around a wheel/tire W. The wheel well 30 is typically a substantially semi-circular opening in the side panel of the vehicle, with an outer edge or fender portion 32 that may be flat or flared depending on the vehicle style. The wheel well's depth extends much farther into the vehicle than the thickness of panel 20 defining its outer edge 32, i.e. the wheel well depth must be deep enough to accommodate the width of wheel W. The interior width of wheel well 30 is usually defined by a curved inner panel or liner 34 forming a solid barrier between the wheel and the interior of the vehicle or the engine compartment, in order to prevent the entry of road debris, mud, snow, salt, etc. into those interior areas.

While the inner surface 34 of the wheel well is often coated with a thick protective barrier, or comprises or is covered by a plastic liner, the curved outer edge or fender portion 32 of the wheel well is often painted metal, or protected with a more decorative but less robust covering. This curved outer edge on the body panel is accordingly more easily damaged by flying rocks, mud, dirt, salt, snow and the like thrown from the wheel at high speed, and the dirt and damage is more visible. Any protective coatings or paint on the outer edge 32 tend to become chipped or worn away, exposing the underlying metal and leading to corrosion. This is not only unsightly, but can require the repair or even replacement of the panel over time.

Protective fender covers are known and sometimes applied over the wheel well outer edge 32 to protect from flying debris. Examples may include extensions of the wheel well liner 34 or separate plastic fender covers secured over the outer edge 32 in a flush fit, perhaps wrapping up over a portion of body panel 20. These fender covers are likely to trap road debris in seams and joints where the covers join the metal of panel 20, leading to hidden corrosion.

Figure 2:
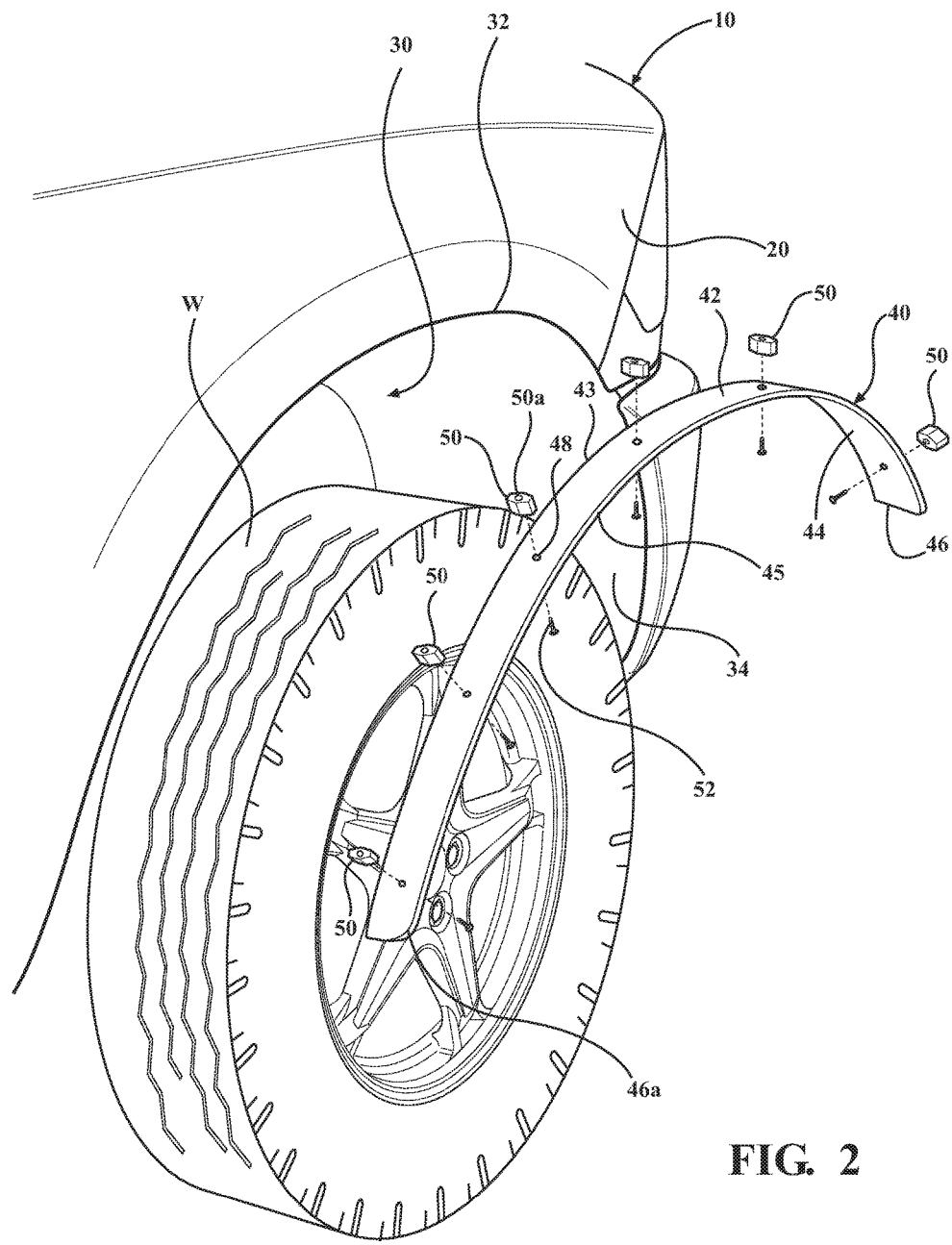
FIG. 2 is an exploded rear perspective view of the guard of FIG. 1 in relation to the wheel well.
Figure 5:
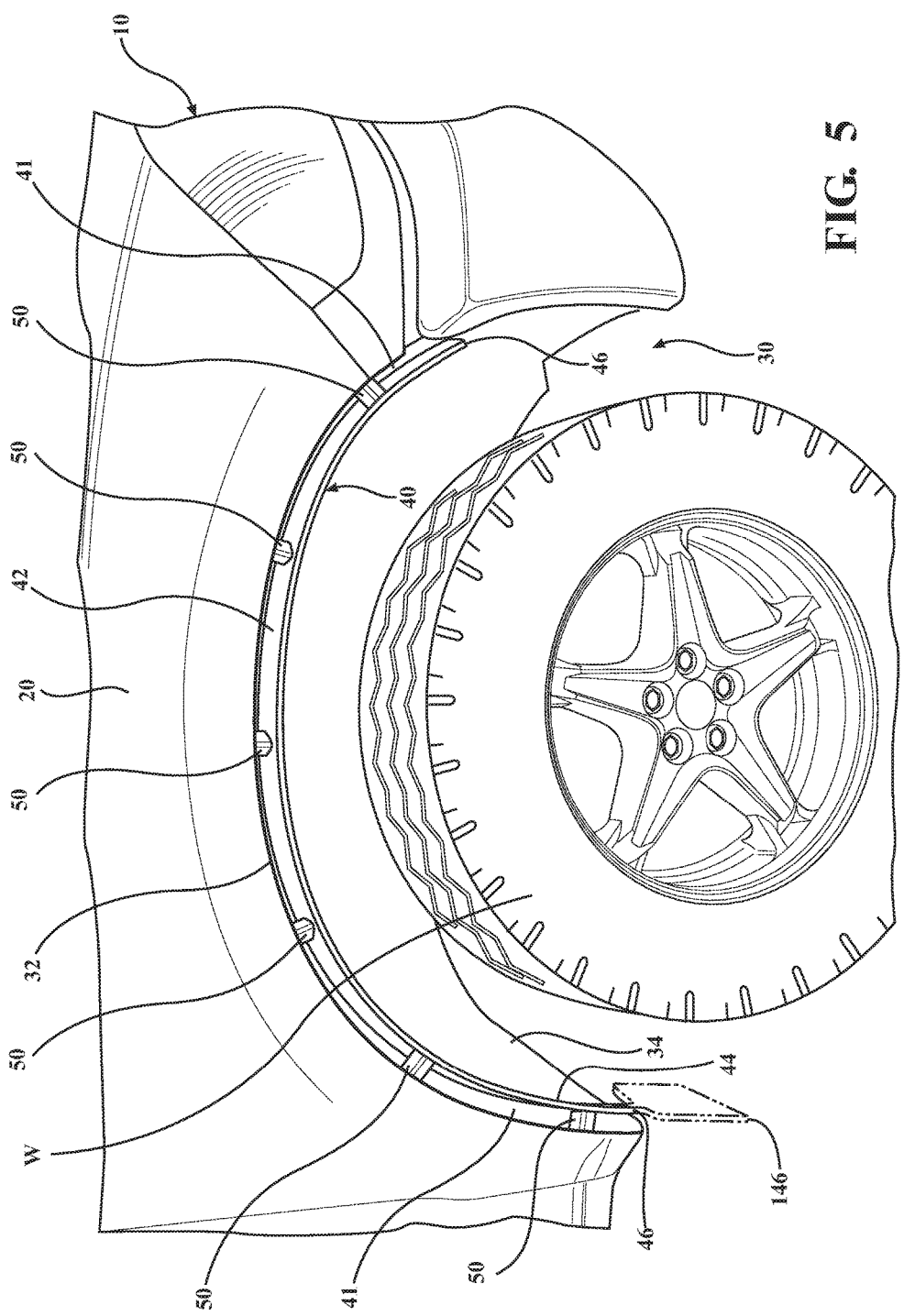
FIG. 5 is identical to FIG. 1, except that it shows a widened mud flap extension at the lower rear end of the installed guard.

Referring to FIGS. 1 and 2, a guard 40 according to the invention is shown both installed (FIG. 1) and exploded from (FIG. 2) wheel well 30. Guard 40 is installed in a generally curved-parallel relationship to wheel well outer edge 32, spaced from outer edge 32 with a substantially continuous gap 41 between them, for example on the order of 1-2" (inches). The width of guard 40 is sufficient to overlie or shield the outer edge 32, which may or may not have a horizontal shelf or flange/fender portion of up to a few inches in horizontal width. For example, illustrated guard 40 has a width on the order of four inches, although the guard's width may vary depending on the width of the wheel well outer edge 32. The width of guard 40 is however much less than the depth of the wheel well 30 as generally measured by the width of the well's curved inner face or liner 34 from the outside edge of the well toward the engine compartment, which is likely to be on the order of eighteen to twenty-four inches. Guard 40 basically overlies and protects at least a majority, and preferably the entirety of the outer wheel well edge 32 in a spaced parallel relationship to the curve of the wheel well, as shown in FIGS. 1 and 5.

Guard 40 has a generally smooth, generally flat upper surface 42, a smooth flat lower surface 44, and ends 46 with preferably rounded outer corners 46a. The upper and lower surfaces 42 and 44 of the guard are described as "flat" even though the guard is installed in a curved configuration, the surfaces being flat in cross-section as best shown in FIG. 3, or before the guard is installed, as best shown in FIG. 4. These curved, flat, smooth upper and lower surfaces, installed in essentially perpendicular horizontal relationship to the vertical plane of the wheel well and with a continuous gap or spacing 41 between upper surface 42 and the wheel well, resist the accumulation of debris and are easy to wash off.

Guard 40 is mounted to and spaced from the wheel well by spacers 50 arrayed along the upper surface 42 at intervals. Spacers 50 may be, for example, plastic or rubber bodies on the order of an inch or two in height, with through-holes 50a for receiving screws or bolts 52. Spacers 50 are shown as separable pieces relative to guard 40, but may be integrally formed with or permanently mounted on the guard. Spacers 50 have a width substantially less than the side-to-side width of guard 40 between guard inner and outer edges 43, 45, for example on the order of one inch, so that debris may flow around the spacers along the curved upper surface 42 of the guard toward the guard ends 46.

Guard 40 includes matching holes 48 for receiving fasteners such as screws or bolts 52 from the lower surface 44, the fasteners 52 extending through the guard, through the spacers 50, and into appropriate horizontal portions of the wheel well outer edge 32 (portions generally perpendicular to the plane of body panel 20) or into an adjacent outer portion of the curved inner face or liner 34 of the wheel well. Screws or bolts 52 can engage preformed fastener-receiving holes, sockets, or trapped nuts in the wheel well, for example existing holes for an outer-edge row of fender well liner screws. Alternately, appropriately spaced holes may be formed in the desired horizontal mounting surface in the wheel well by drilling or by using self-tapping screws.

As best shown in FIG. 3, where the wheel well outer edge 32 includes a horizontal flange, fender portion, or shelf 32a, guard 40 is preferably secured with a fastener 52 through a hole 36 formed in shelf 32a, with a fixed or removable nut or similar receiver 33 located behind shelf 32a. If vertical body panel 20 ends in a vertical edge at its lower end 21, then the spacer connection would be made to an outer portion of the inner curved face/liner 34 of the wheel well surface adjacent vertical edge 21.

The connection formed by fasteners 52 between guard 40, spacers 50, and a horizontal mounting surface such as 32a in the wheel well can be further secured by using washers 54 between the fastener head and the lower surface 44 of the guard 40, and/or fender clip nuts, Belleville washers or similar fastener tensioning devices (shown in phantom at 33 in FIG. 3) instead of or in addition to nut member 33 on the interior of the wheel well mounting surface.

Referring now to FIG. 5, guard 40 is shown with an optional mud flap extension 146 at the lower rear end of the wheel well. Mud flap extension 146 is a widened portion of the flat-sectioned material of the guard, extending from the nominal rear end 46 of the guard below the rear terminal point of the wheel well 30 to reduce the likelihood of stones, mud, etc. from being thrown rearwardly of the vehicle. Mud flap extension 146 widens at least inwardly from the nominal inner edge 43 of guard 40, corresponding approximately to the width of wheel W to catch most or all of the stones, mud, etc. thrown from the wheel. Mud flap extension 146 may also widen outwardly from the nominal outer edge 45 of guard 40 to provide coverage if wheel W is especially wide and extends partly outside the wheel well.

Description of Operation

In one preferred and exemplary installation procedure, the vehicle 10 is jacked off the ground by the frame, and the wheels W turned left or right as needed to provide clear access to the wheel well's outer edge 32, and more specifically to the associated horizontal mounting surface at the outer edge such as 32a.

If not already provided with holes 48, the holes are drilled in guard 40 with spacing determined by vehicle brand, fender/wheel well style, and any existing holes in the suitable horizontal surface 32a of the wheel well outer edge that will be used to mount the guard. If spacers 50 are not already provided with holes 50a, slightly smaller diameter holes 50a are drilled in the spacers. For example, holes 48 in guard 40 may be on the order of ½" (inches) while holes 50a in spacers 50 may be on the order of 1/16" (inches).

A fastener 52 such as a metal screw with a washer 54 is placed through each hole 48 in the fender guard 40, and then through hole 50a in a corresponding spacer 50 on the upper surface 42 of the guard, until all of the spacers 50 are assembled to the upper surface of the guard with the tips of fasteners 52 extending from the upper ends of the spacers.

The tips of fasteners 52 are then aligned with and inserted into corresponding holes 36 in the horizontal mounting surface on the outer edge 32 of the wheel well. The areas where spacers 50 and fasteners 52 are to come into contact with the wheel well mounting surface are preferably treated with an undercoating type spray before applying the guard.

Starting at one end of the guard 40, fasteners 52 are tightened while holding spacers 50 with pliers or similar to prevent the spacers from turning. Depending on the geometry of the wheel well outer edge 32 or any horizontal flange, etc. 32a, a fastener receiving member such as a standard nut or fender clip nut may be held in place behind each hole 36 as the associated fastener is tightened.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been used to describe new and useful improvements in science and the useful arts. The scope of the invention supported by the above disclosure should accordingly be construed within the scope of what it teaches and suggests to those skilled in the art, and within the scope of any claims that the above disclosure supports in this application or in any other application claiming priority to this application.

The invention claimed is:

1. In combination with a vehicle wheel well having an outer edge defined by a vehicle body panel or fender, a wheel well fender edge guard comprising:

a generally narrow, flat-sectioned, rectangular panel overlying at least a majority of the wheel well outer edge and curved to correspond to a corresponding curvature of the wheel well outer edge and mounted to the wheel well in a curved-parallel relationship to the wheel well outer edge with a substantially continuous gap between an upper face of the guard and the wheel well outer edge, the guard forming a substantially flat-sectioned curved plane with a substantially flat cross-sectional contour across the upper face of the guard and across a lower face of the guard, the guard mounted adjacent and spaced from the wheel well outer edge with the upper and lower faces of the guard maintained in an essentially perpendicular orientation to a generally vertical plane of the wheel well opening and generally parallel to a horizontal tread face of a tire on a wheel in the wheel well.

2. The combination of claim 1, wherein the guard has a width corresponding to a width of the wheel well outer edge, but substantially less than a width of the wheel well and of the tire in the wheel well such that the guard does not extend a significant distance into an interior of the wheel well or overlie a majority of the tire and primarily protects the outer edge of the wheel well from debris thrown by the tire.

3. The combination of claim 1, wherein the guard is spaced from the wheel well outer edge by a plurality of spacers secured at spaced intervals between the upper face of the guard and the wheel well.

4. The combination of claim 3, wherein the spacers have a width substantially less than the width of the guard.

5. The combination of claim 1, wherein a lower rear end of the guard adjacent a lower rear end of the wheel well comprises a mud flap portion having a width substantially greater than the width of the guard and extending farther into the wheel well than the guard.

\* \* \* \* \*